United States Patent [19]
Matthews et al.

[11] Patent Number: 5,265,780
[45] Date of Patent: Nov. 30, 1993

[54] COMBINED BACKPACK FRAME AND CLIMBING STAND

[76] Inventors: Timothy I. Matthews, Box 102-A, R.D.#2; John C. Wyckoff, Box 174, R.D.#2, both of Belvidere, N.J. 07823

[21] Appl. No.: 894,655

[22] Filed: Jun. 5, 1992

[51] Int. Cl.5 .............................................. A45F 4/02
[52] U.S. Cl. .................................. 224/155; 224/210; 182/133; 182/187
[58] Field of Search ............. 224/151, 153, 155, 210, 224/211, 202, 209, 257, 259; 297/118, 129; 135/901; 182/133, 134, 187; 108/152

[56] References Cited

U.S. PATENT DOCUMENTS

| | | | |
|---|---|---|---|
| 3,733,017 | 5/1973 | Pletz | 224/211 |
| 4,022,292 | 5/1977 | Van Gompel | 224/155 X |
| 4,321,982 | 3/1982 | Strickland | 182/134 X |
| 4,582,165 | 4/1986 | Latini | 224/155 X |
| 4,776,503 | 10/1988 | Sink | 224/153 |
| 4,909,353 | 3/1990 | Govin et al. | 182/187 |
| 5,103,935 | 4/1992 | Amacker | 182/187 |

*Primary Examiner*—Henry J. Recla
*Assistant Examiner*—Glenn T. Barrett
*Attorney, Agent, or Firm*—Alfred C. Hill

[57] ABSTRACT

A combined backpack frame and object climbing wildlife stand having a plurality of utilization modes including a backpack mode, an object climbing mode and a wildlife stand mode comprising a first arrangement to provide a backpack frame in the backpack mode, a climbing device in the climbing mode and a platform in the stand mode; a second arrangement detachably connected to the first arrangement to encircle the object to assist the first arrangement in climbing when in the climbing mode and to stabilize the first arrangement in the stand mode; a third arrangement detachably connected to one end of the first arrangement at approximately a right angle thereto to provide a load bearing member when in the backpack mode and to be detached from the first arrangement to provide a climbing assist member when in the climbing mode and to provide a seat for a user in the stand mode after climbing to a desired height on the object; and a fourth arrangement detachably connected to the third arrangement to encircle the object to assist the third arrangement in climbing when in the climbing mode and to stabilize the third arrangement in the stand mode; the second and fourth arrangements being stored in the first arrangement when in the backpack mode.

20 Claims, 2 Drawing Sheets

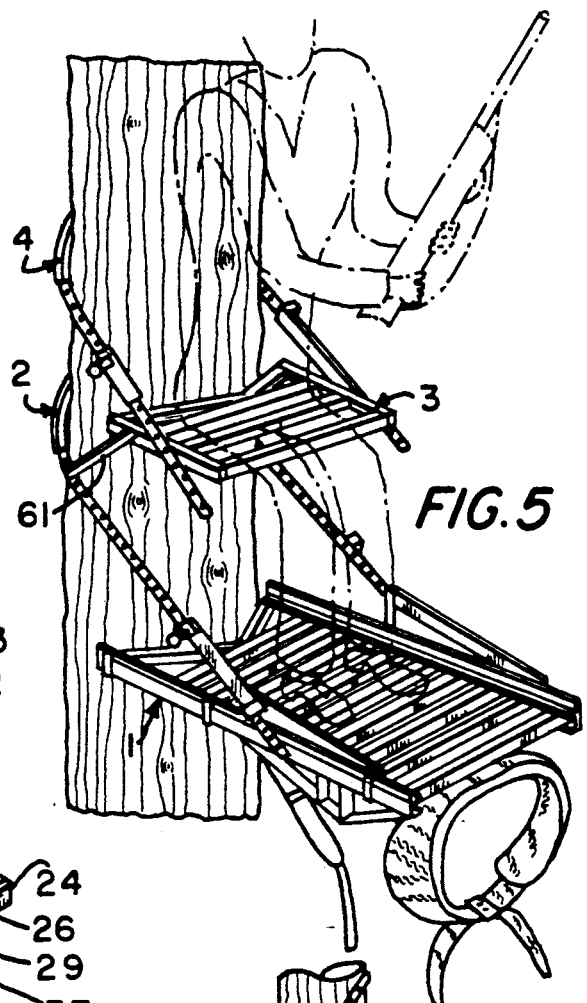
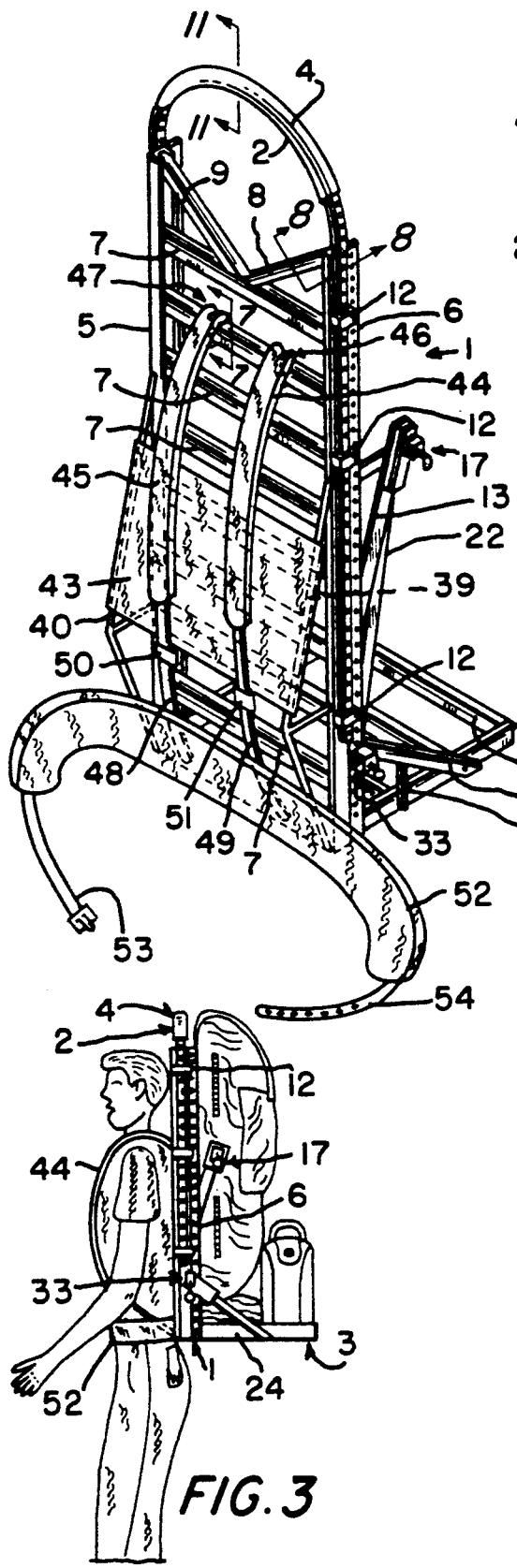
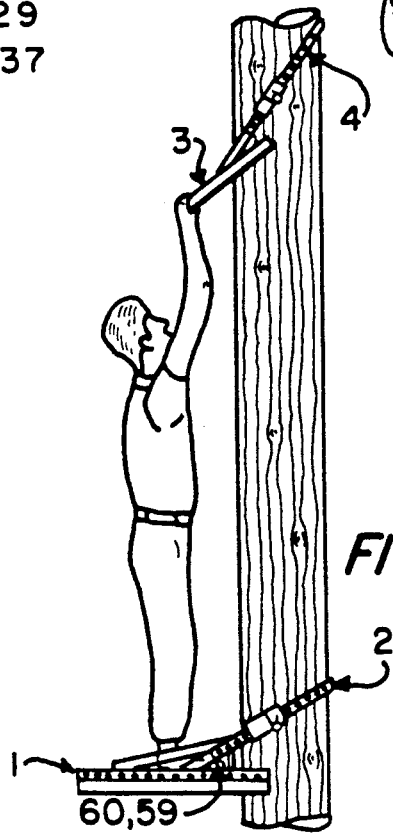

COMBINED BACKPACK FRAME AND CLIMBING STAND

BACKGROUND OF THE INVENTION

The present invention relates to backpack frame and climbing wildlife stands and more particularly to a combined backframe and object climbing wildlife stand having a plurality of utilization modes including a backpack mode, an object climbing mode and a wildlife stand mode.

For many years hunters and wildlife photographers have used tree stands as a means of concealment from their quarry. Movement, noise and scent are the three primary means by which an animal can detect the hunter or wildlife photographer hereafter referred to as a user. By using tree stands, the user can attempt to obscure themselves from the quarry's means of detection.

Because most wildlife seek out danger on the ground, elevated platforms are used as a means to conceal slight movements by the user. Remaining motionless for extended periods of time while waiting for wildlife to appear can be a difficult task. The need for movement can also be minimized by providing the user with a comfortable seat. Being comfortable enables the user to remain motionless for longer periods of time.

Movement causes noise which may also alert wildlife to possible danger. Most tree stands contain moving parts as a means of affixing the stand to the tree. These parts have a general tendency to produce noise when they move against each other. As a consequence of this noise, the quarry may be alerted to the presence of the user. By minimizing the number of moving parts, the noise produced while using a tree stand may also be minimized.

With increasing human encroachment on today's wildlife habitats, users are finding themselves venturing further into remote areas to find their quarry. In order to achieve remoteness, users may find it necessary to extend their stay for several days or longer. Backpacks are then utilized to carry the gear, hunting supplies and food required for such extended stays. Backpacks are lightweight and can afford a means to carry heavy loads for long distances. Many conform to the contour of the back causing as little strain and discomfort as possible to the backpacker. Cushioning between the backpack and user also lends itself to alleviate strain and discomfort.

U.S. Pat. Nos. 4,582,165 and 4,989,766 teach the combination of a backpack and tree stand, U.S. Pat. Nos. 4,802,552 and 3,955,645 teach the use of a tree stand employing a climbing assist member rather than having the user hug the tree or pole being climbed and U.S. Pat. Nos. 4,488,620 and 3,856,111 teach the use of a seat for the user being used to assist in climbing the tree or pole, or as employed herein, an object. None of these prior art patents teach the combination of a backpack frame and object climbing wildlife stand having a plurality of utilization modes including a backpack mode, an object climbing mode and a wildlife stand mode where in the backpack mode camping equipment is carried rather than just the climbing assist component. In other words, none of these prior art patents teach or even suggest the combination of the three operating modes where the seat component not only acts as a seat but also as a load bearing member for a backpack frame and a climbing assist member.

In addition, the prior art devices incorporate many moving parts which may cause excessive noise when attaching to or climbing an object. These prior art patents also contain several detachable parts which may become loose while traveling to or from the object or while attaching the device to the object. Also in the prior art there is a noticeable lack of a back support system for the backpackers comfort. In addition, it is taught in certain of these prior patents that the devices or components in contact with the object (tree or pole) cut into the object and, thus, would damage the object which is being outlawed in certain states in the United States.

SUMMARY OF THE INVENTION

An object of the present invention is to provide an improved combined backpack frame and object climbing wildlife stand.

Another object of the present invention is to provide a combined backpack frame and object climbing wildlife stand having a plurality of utilization modes including a backpack mode, an object climbing mode and a wildlife stand mode.

Still another object of the present invention is to provide a combined backpack frame and object climbing wildlife stand having a plurality of utilization modes including a backpack mode, an object climbing mode and a wildlife stand mode where the load bearing member in the backpack mode is also utilized to assist in climbing an object in the climbing mode and as a seat for the user in the wildlife stand mode.

A feature of the present invention is the provision of a combined backpack frame and object climbing wildlife stand having a plurality of utilization modes including a backpack mode, an object climbing mode and a wildlife stand mode comprising first means to provide a backpack frame in the backpack mode, a climbing device in the climbing mode and a platform in the stand mode; second means detachably connected to the first means to encircle the object to assist the first means in climbing when in the climbing mode and to stabilize the first means in the stand mode; third means detachably connected to one end of the first means at approximately a right angle thereto to provide a load bearing member when in the backpack mode, to be detached from the first means to provide a climbing assist member when in the climbing mode and to provide a seat for a user in the stand mode after climbing to a desired height on the object; fourth means connected to the third means to encircle the object to assist the third means in climbing when in the climbing mode and to stabilize the third means in the stand mode; the second and fourth means being stored on the first means when in the backpack mode.

Another feature of the present invention is the provision of a combined backpack frame and object climbing wildlife stand as mentioned above having four detachable components and four captured spring pin assemblies which are the only other moving parts thereof which minimizes the chance of losing small parts when attaching the stand to an object or during transportation.

A further object of the present invention is the provision of a combined backpack frame and object climbing wildlife stand having a minimum number of moving parts as mentioned above that ensures the quietness of the subject stand to enable the user to approach and set up the subject stand without alerting the quarry to possible danger.

BRIEF DESCRIPTION OF THE DRAWING

Above-mentioned and other features and object of this invention will become more apparent by reference to the following description taken in conjunction with the accompanying drawing, in which:

FIG. 2 is a perspective view of the back of the combined backpack frame and object climbing wildlife stand of FIG. 1;

FIG. 3 is an illustration showing the combined backpack frame and object climbing wildlife stand in accordance with the principles of the present invention being utilized in the backpack mode;

FIG. 4 is an illustration of the combined backpack frame and object climbing wildlife stand in accordance with the principles of the present invention being utilized in the object climbing mode;

FIG. 5 is an illustration of the combined backpack frame and object climbing wildlife stand in accordance with the principles of the present invention being employed in the stand mode;

DESCRIPTION OF THE PREFERRED EMBODIMENTS

Figure 1:
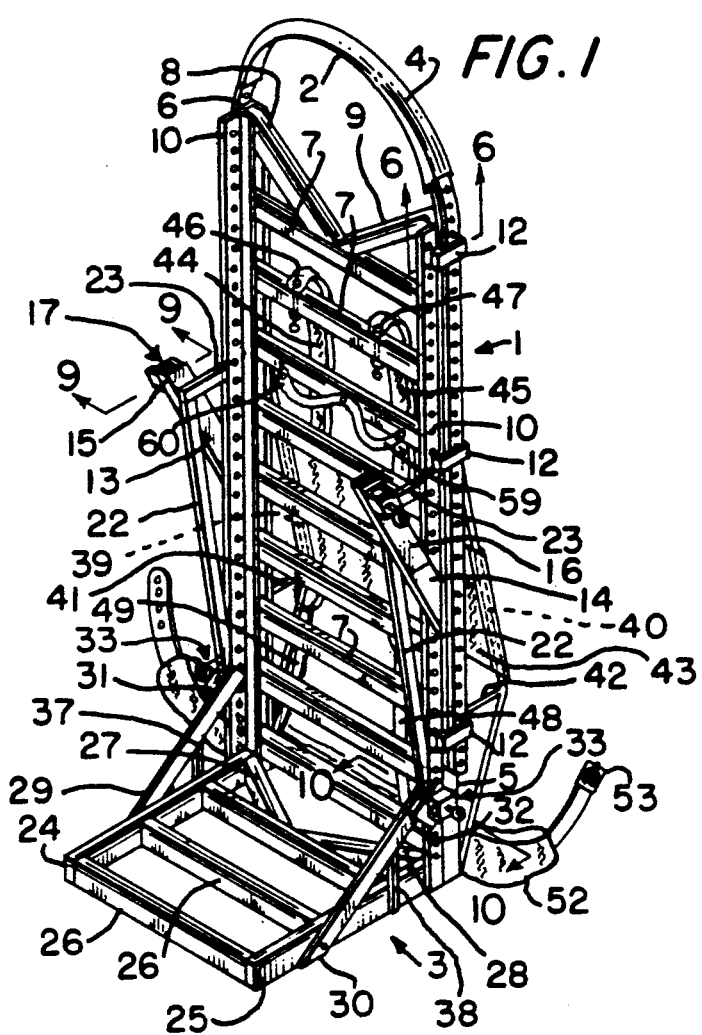
FIG. 1 is a perspective view of the combined backpack frame and object climbing wildlife stand in accordance with the principle of the present invention.

Referring to FIGS. 1 and 2, the combined backpack frame and object (tree or pole) climbing wildlife stand having a plurality of utilization modes including a backpack mode as shown in FIG. 3, an object climbing mode as shown in FIG. 4 and a wildlife stand mode as shown in FIG. 5 includes four major components. These components are a first means in the form of a rectangular component 1, a second means in the form of a flexible band 2 connected to the first rectangular component 1 and encircling the object to assist the first means in climbing when in the climbing mode and to stabilize the rectangular component 1 in the stand mode, a third means in the form of a second rectangular component 3 which is connected at one end to the first rectangular component 1 at approximately a right angle thereto to provide a load bearing member when in a backpack mode, to be detached from the first rectangular component 1 to provide a climbing assist member when in the climbing mode and to provide a seat for a user in the stand mode after climbing to a desired height of the object as illustrated in FIGS. 4 and 5 and a fourth means in a form of a second flexible band 4 detachably connected to the second rectangular component 3 and encircling the object to assist the component 3 in climbing the object when in the climbing mode and to stabilize component 3 in the stand mode, the flexible bands 2 and 4 being stored on the rectangular component 1 when in the backpack mode as illustrated in FIGS. 1, 2 and 3.

Rectangular component 1 is formed by a pair of elongated inverted F-shaped channel members 5 and 6 disposed parallel to each other as illustrated in FIGS. 1 and 2, a plurality of hollow members 7 each disposed between and perpendicular to the channel members 5 and 6, and a pair of structural members 8 and 9 having a U-shaped channel configuration each connected to an end of a different one of members 6 and 7 remote from the second rectangular component 3 and extending at an angle therefrom to the adjacent one of the hollow members 7 to provide a V-shaped area to engage the object in the climbing and stand modes.

Figure 7:
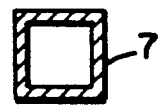
FIG. 7 is a cross-sectional view taken along line 7—7 of FIG. 2.
Figure 6:
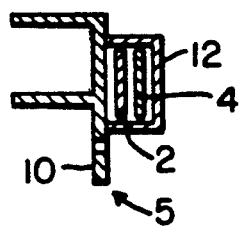
FIG. 6 is a cross-sectional view taken along line 6—6 of FIG. 1.
Figure 8:
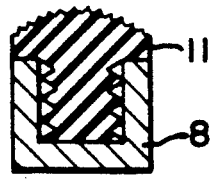
FIG. 8 is a cross-sectional view taken along line 8—8 of FIG. 2.

The cross-section of members 5 and 6 is illustrated in FIG. 6 with the leg 10 of the F-shaped channel members 5 and 6 having a plurality of apertures spaced along its length to enable securing backpacks and other equipment to the first rectangular component 1 when in the backpack mode as shown in FIG. 3. The cross-sectional configuration of members 7 is shown in FIG. 7 while the cross-sectional configuration of members 8 and 9 is shown in FIG. 8. As illustrated in FIG. 8 in detail and also in FIGS. 1 and 2, the U-shaped channel members 8 and 9 have inserted in the channel portion thereof a resilient material 11, such as a rubber material, which provides traction against the object being climbed, helps prevent slippage of the stand of this invention on the object being climbed and protects the object from damage by the stand of the present invention. The resilient material 11 also causes a quiet engagement against the object being climbed. As illustrated in FIGS. 1 and 2 the open end of the channel members 8 and 9 containing material 11 as shown in FIG. 8 faces the object being climbed.

Members 5 and 6 have fastened thereto a plurality of U-shaped members 12 along the outer surface thereof as shown in FIGS. 1, 2 and 6 to enable the carrying or storing of flexible members 2 and 4 when the combination of the present invention is in the backpack mode.

When component 1 is in the climbing mode and the stand mode the flexible band 2 encircles the object to be climbed and is inserted into structural members 13 and 14 carrying thereon U-shaped members 15 and 16 so that one end of flexible band 2 will be inserted between members 13 and 15 and the other end of flexible band 2 between members 14 and 16. The angle at which members 13 and 14 are connected relative to the members 5 and 6 is in the order of 30 degrees to provide ease of climbing and ease of stabilizing the stand in the stand mode. Flexible band 2 may be adjusted to fit the different girths of the object to be climbed by the use of a pin and spring assembly 17 which includes a pin 17a to engage apertures in spaced relationship along the length of the band 2. Assembly 17 includes a housing 18 secured to member 15, a spring 19 and a ring 20 connected to pin 17a so that when the band 2 is inserted into the space between members 13 and 15 the user pulls on ring 20 to clear the opening 21 to enable passage of band 2 with the spring 19 being compressed so that when the user has adjusted band 2 to encircle the object to be climbed the user lets go of ring 20 and the compressed spring 19 causes the pin 17a to pass through the selected aperture in band 2 and engages an aperture in member 13 to hold the band in the proper position during the climbing and stand mode. Members 22 and 23 connected to members 5 and 6 and members 13 and 14 increase the structural strength of members 13 and 14.

The second rectangular component 3 includes U-shaped members 24 and 25 disposed parallel to one another and plurality of members 26 disposed between another and perpendicular to members 24 and 25. Members 27 and 28 each have one end thereof connected to the ends of the associated one of members 24 and 25 with their other ends connected to the adjacent one of member 26 to provide a second V-shaped area to engaged the object to be climbed in the climbing mode and stand mode. As in the case of members 8 and 9 on the first rectangular component 1, members 27 and 28 are U-shaped channels with the opening thereof facing the object to be climbed and having inserted therein a resilient material, such as rubber, to engage the object to be climbed in a nonskid relationship, to prevent damage to the object to be climbed and also to quiet the combination described herein when engaging the object to be climbed.

Figure 10:
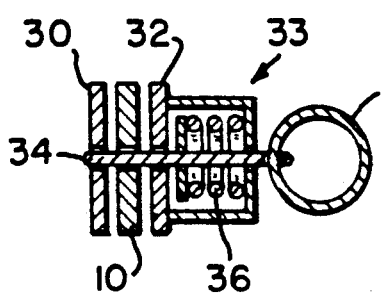
FIG. 10 is a cross-sectional view taken along line 10—10 of FIG. 1.

As illustrated in FIG. 1, one end of members 29 and 30 are connected to members 24 and 25, respectively, at a predetermined angle, such as 20 degrees. The other end of members 29 and 30 have fastened thereto U-shaped members 31 and 32, respectively, each of which carry another pin-spring assembly 33 as illustrated in FIG. 10. The end of component 3 adjacent component 1 rests thereagainst while the members 29 and 30 extend up to the leg 10 of the members 5 and 6 with the pin 34 of assembly 33 engaging an appropriate one of the apertures in the leg 10 of members 5 and 6. As in the arrangement of assembly 17, the pin 34 has connected thereto a ring 35 which the user uses to extract the pin 34 to clear the space between members 30 and 32 thereby compressing spring 36 so that when the components are in their proper position and ring 35 is released spring 36 causes pin 34 to engage the aperture in the leg 10 of members 5 and 6 and the aperture in members 29 and 30 to thereby hold component 3 in its load bearing position on component 1 in the backpack mode. Thus, in the backpack mode component 3 supports the load in the form of camping equipment and supplies carried in the backpack mode, such as a backpack and other camping equipment along with food. The stability and strength of members 29 and 30 are increased by the addition of braces 37 and 38.

Members 29 and 31 along with its pin and spring assembly 33 and members 30 and 32 along with its pin assembly 33 receive the appropriate ends of band 4 which encircles the object to be climbed and is adjusted for the girth of the object to be climbed by the pin assemblies 33 engaging appropriate apertures along band 4 when component 3 is detached from component 1 to be utilized in the climbing and stand mode.

When in the backpack mode the combined components provide a support system which conforms to the natural contour of a user's back. This support system includes a pair of tubular members 39 and 40 each having their ends fastened to members 6 and 5, respectively, such that a central portion thereof is raised from members 6 and 5 by members 41 and 42 substantially as illustrated in FIGS. 1 and 2. Between members 39 and 40 at an appropriate height to assure conforming to the natural contour of a user's back is secured a cloth mesh member 43 extending between members 39 and 40 to fit the user's back in a comfortable fashion and to ventilate the area of the user's back in contact with the backpack frame of the present invention.

A shoulder harness in the form of shoulder straps 44 and 45 are secured to one of the members 7 by a pin and ring arrangement 46 and 47 and having their other end connected to the bottom one of members 7 by straps 48 and 49 including therewith adjusting means 50 and 51 to enable a comfortable fitting to the user carrying the backpack frame. In addition, there is provided a belt arrangement to encircle the waist of the user when the combination of the present invention is employed in the backpack mode. This belt arrangement includes a padded portion 52 secured to the lower end of component 1 with one end of padded portion 52 being connected to a buckle type arrangement 53 and the other end of padded portion 52 being connected to a belt adjusting type arrangement 54.

Figure 11:
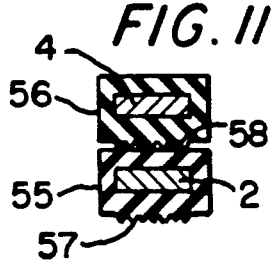
FIG. 11 is a cross-sectional view taken along line 11—11 of FIG. 2.
Figure 9:
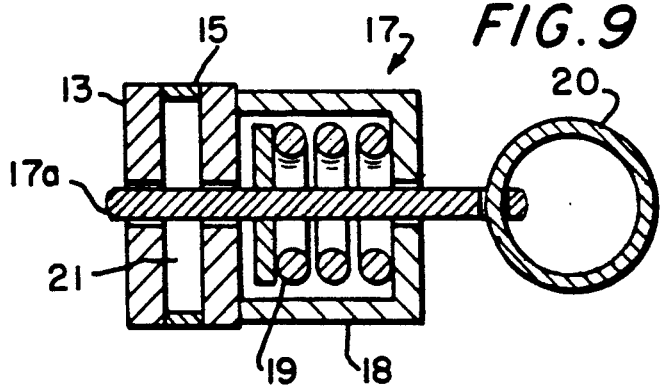
FIG. 9 is a cross-sectional view taken along line 9—9 of FIG. 1.

As shown in FIGS. 2 and 11 the flexible bands 2 and 4 are encased in a resilient material 55 and 56, respectively, for that area of the flexible bands which engage the object to be climbed. The surface of the resilient material 55 and 56 as illustrated at 57 and 58, respectively, is rippled or dimpled to provide increased traction against the object to be climbed with the resilient material providing a deadening of any noise that may emanate from fastening the combination of the present invention to the object to be climbed.

As pointed out previously, the members 5 and 6 in the leg portion 10 thereof have holes to receive pins for the attachment of various backpacks to enable the carrying of material into the area of the object to be climbed. All the material employed in the combination of the present invention with the exception of the resilient material are lightweight materials that have structural strength, such as aluminum or structurally strong plastic. In the case of aluminum the material may be anodized for corrosion protection.

As is illustrated in FIG. 3, the combination of the present invention can be employed as a backpack frame where component 1 enables the fastening thereto of backpack and other things, such as a bed roll or the like and other camping supplies, to be carted into the area of the object to be climbed with component 3 bearing the load of that material fastened to the backpack frame of component 1.

As illustrated in FIG. 4, component 1 and flexible band 2 have been placed in the climbing mode about the object to be climbed and the component 3 and its flexible band 4 have been placed in the climbing mode about the object to be climbed. To accomplish the climbing of the object the feet of the user are placed in the foot straps 59 and 60 fastened to component 1 (see FIG. 1) and the user grabs the component 3. Component 3 and the band 4 are shimmied up the object and then pivoted downwardly until it grips the object. The component 1 is then shimmied up the object by lifting the body of the user with the feet in straps 59 and 60 to pivot the component 1 and the band 2 from the object so that the band 2 may be slipped up into a new position. When the platform (component 1) is then pressed against the object it will be held in place. This process is repeated to thereby enable the user to climb the object in successive steps.

As illustrated in FIG. 5, once the user has employed components 1 and 3 together with their related bands 2 and 4 to climb to a desired height on the object, a member 61 is connected between component 3 and band 2 on both sides of the combination of the present invention to assist in stabilizing the components 1-4 in the stand mode with the user being able to place his feet on component 1 and sit on component 3 to await the appearance of wildlife either to be shot by firearms or bow and arrow or by photographic means.

The combined backpack frame and object climbing wildlife stand as described hereinabove consists of four detachable components including components 1 and 3 and the two flexible bands 2 and 4 with the flexible bands attaching components 1 and 3 to the object to be climbed. In addition, there are four captured spring-pin assemblies 17 and 33 which are the only other moving parts of the combination in accordance with the principles of the present invention. This minimizes the chance of losing small parts when attaching the combination of the present invention to an object to be climbed or during transportation in the backpack mode. The lack of moving parts also insures the quietness of the combination of the present invention. This enables the user to approach and set up the combined backpack frame and object climbing wildlife stand without alerting the wildlife of the presence of possible danger.

While we have described above the principles of our invention in connection with specific apparatus, it is to be clearly understood that this description is made only by way of example and not as a limitation to the scope of our invention as set forth in the objects thereof and in the accompanying claims.

We claim:

1. A combined backpack frame and climbing wildlife stand enabling a user to employ said combination to climb a selected one of a tree and a pole, said combination having a plurality of utilization modes including a backpack mode, a climbing mode and a wildlife stand mode, said combination comprising:
   first means to provide a backpack frame in said backpack mode, a climbing device in said climbing mode and a platform in said stand mode;
   second means detachably connected to said first means to encircle said selected one of a tree and a pole to assist said first means in climbing said selected one of a tree and a pole when in said climbing mode and to stabilize said first means in said stand mode;
   third means detachably connected to said first means at approximately a right angle thereto to provide a load bearing member when in said backpack mode, to be detached from said first means to provide a climbing assist member when in said climbing mode and to provide a seat for said user in said stand mode after climbing in said climbing mode to a desired height on said selected one of a tree and a pole; and
   fourth means detachably connected to said third means to encircle said selected one of a tree and a pole to assist said third means in climbing said selected one of a tree and a pole when in said climbing mode and to stabilize said third means in said stand mode;
   said second and fourth means being stored on said first means when in said backpack mode.

2. The combination according to claim 1, further including
   fifth means secured to said first means to comfortably engage the back of said user in said backpack mode to provide comfort for said user;
   sixth means secured to said first means to encircle the waist of said user in said backpack mode to hold said first means in place against the back of said user; and
   seventh means secured to said first means to provide shoulder straps for said user in said backpack mode.

3. The combination according to claim 2, wherein said sixth means is padded adjacent the back of said user to provide additional comfort for said user.

4. The combination according to claim 1, wherein said first means includes
   a first pair of elongated channel members disposed parallel to each other,
   a first plurality of hollow members each connected to, disposed between and perpendicular to each of said first pair of channel members, and
   a first pair of structural members each connected to an end of a different one of said first pair of channel members remote from said third means, each of said first pair of structural members extending at an angle from its associated one of said first pair of channel members to an adjacent one of said first plurality of hollow members to provide a first V-shaped area to engage said selected one of a tree and a pole in said climbing and stand modes,
   said first pair of channel members, said first plurality of hollow members and said first pair of structural members forming a first rectangular component utilized as part of said backpack frame in said backpack mode and as said platform in said climbing and stand modes.

5. The combination according to claim 4, further including
   a pair of assemblies each having two ends and a middle portion between said two ends, each of said pair of assemblies having both of their said two ends secured to a different one of said first pair of channel members at spaced locations therealong and said middle portion thereof predeterminedly spaced from an associated one of said first pair of channel members, and
   a fabric stretched between said pair of assemblies to comfortably engage the back of said user in said backpack mode to provide comfort for said user.

6. The combination according to claim 5, wherein each of said assemblies have smooth surfaces to prevent cutting said fabric in an area of contact therewith.

7. The combination according to claim 5, further including
   fifth means secured to said pair of assemblies to encircle the waist of said user in said backpack mode to hold said first rectangular component in place adjacent the back of said user, said fifth means being padded adjacent the back of said user to provide additional comfort for said user.

8. The combination according to claim 4, further including
   a plurality of U-shaped members secured in a spaced relationship to an outer surface of each of said first pair of channel members to store said second means and said fourth means in a U-shaped configuration in said backpack mode.

9. The combination according to claim 4, wherein each of said first pair of structural members include
   a U-shaped channel member having an opening facing said selected one of a tree and a pole when in said climbing and stand modes, and
   a resilient material disposed in said opening of said U-shaped channel member to protect said selected one of a tree and a pole in said climbing and stand modes.

10. The combination according to claim 4, wherein said second means includes a second pair of structural members each connected to a different one of said first pair of channel members at a predetermined location therealong and extending therefrom at a first predetermined angle, a first flexible band to encircle said selected one of a tree and a pole and to be received by each of said second pair of structural members in said climbing and stand modes, and a first pair of securing means each carried by a different one of said second pair of structural members to adjustably secure said first flexible band to said second pair of structural members.

11. The combination according to claim 10, wherein said first flexible band has a predetermined length and includes a plurality of spaced apertures along said predetermined length to cooperate with said first pair of securing means for securing said first flexible band to said second pair of structural members and to adjust for different girths of said selected one of a tree and a pole.

12. The combination according to claim 11, wherein said first pair of securing means each include
a pin and spring assembly.

13. The combination according to claim 10, further including
a resilient material encasing said first flexible band at least in an area thereof contacting said selected one of a tree and a pole to protect said selected one of a tree and a pole in said climbing and stand modes.

14. The combination according to claim 10, wherein said third means includes
a second pair of elongated channel members disposed parallel to each other, a second plurality of hollow members each connected to, disposed between and perpendicular to each of said second pair of channel members, a third pair of structural members each connected to an end of a different one of said second pair of channel members adjacent said first pair of channel members, each of said third pair of structural members extending at an angle from its associated one of said second pair of channel members to an adjacent one of said second plurality of hollow members to provide a second V-shaped area to engage said selected one of a tree and a pole in said climbing and stand modes, said second pair of elongated channel members, said second plurality of hollow members and said third pair of structural members forming a second rectangular component utilized as said load bearing member in said backpack mode, said climbing assist member in said climbing mode and said seat in said stand mode, a fourth pair of structural members each connected to a different one of said second pair of channel members at a second predetermined location therealong and extending therefrom at a second predetermined angle, and a second pair of securing means each carried by a different one of said fourth pair of structural members to detachably secure said second rectangular component to said first pair of channel members.

15. The combination according to claim 14, wherein each of said third pair of structural members include
a U-shaped channel member having an opening facing said selected one of a tree and a pole when in said climbing and stand modes, and a resilient material disposed in said opening of said U-shaped channel member to protect said selected one of a tree and a pole in said climbing and stand modes.

16. The combination according to claim 14, wherein each of said first pair of channel members is an inverted F-shaped channel member, a leg portion of said inverted F-shaped channel member having holes spaced along a predetermined length thereof, a selected one of said holes being employed by said second pair of securing means to detachably secure said second rectangular component to said first pair of channel members and others of said holes are employed to secure a backpack and other gear to said first rectangular component.

17. The combination according to claim 14, wherein said fourth means includes
a second flexible band to encircle said selected one of a tree and a pole and to be received by each of said fourth pair of structural members and secured thereto by said second pair of securing means when said second rectangular component is detached from said first rectangular component for utilization in said climbing and stand modes.

18. The combination according to claim 17, further including
a resilient material encasing said second flexible band at least in an area thereof contacting said selected one of a tree and a pole to protect said selected one of a tree and a pole in said climbing and stand modes.

19. The combination according to claim 17, wherein said second flexible band has a predetermined length and includes a plurality of spaced apertures along said predetermined length to cooperate with said second pair of securing means for securing said second flexible band to said fourth pair of structural members and to adjust for different girths of said selected one of a tree and a pole.

20. The combination according to claim 19, wherein said second pair of securing means each include
a pin and spring assembly.

* * * * *